Nov. 1, 1932.  C. W. HOUGH  1,886,188
HIGH FREQUENCY GENERATOR AND MODULATOR
Filed July 22, 1930  4 Sheets-Sheet 1
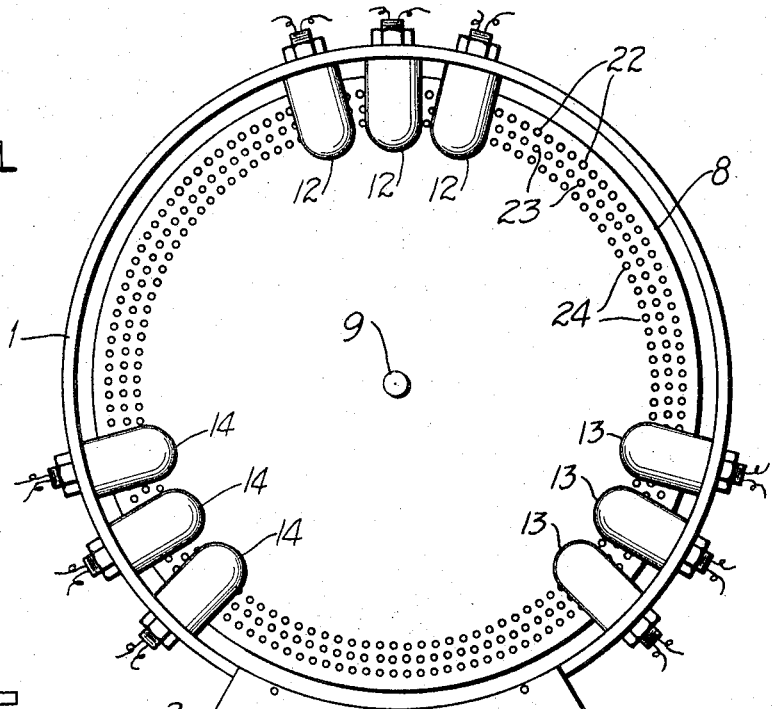
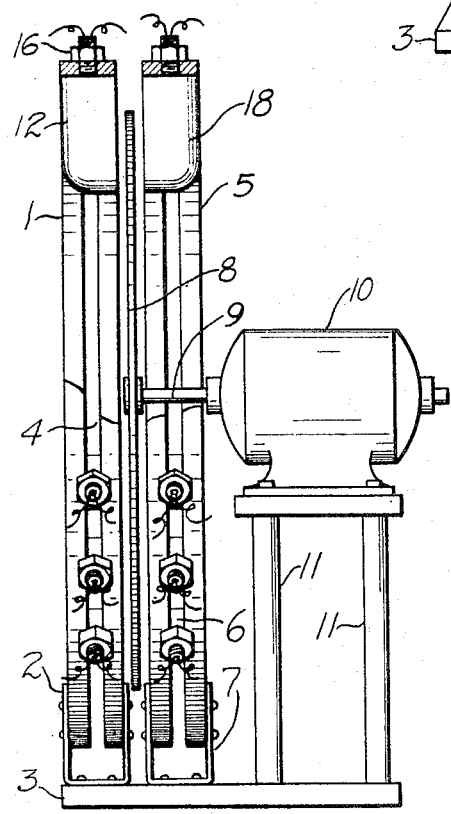
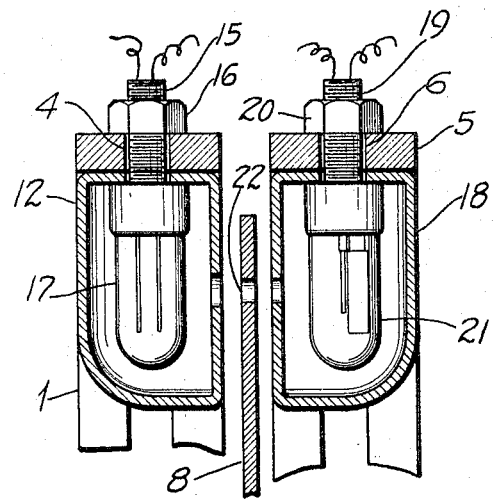
INVENTOR
Clinton W. Hough.
BY
Wm. J. Herdman
ATTORNEY

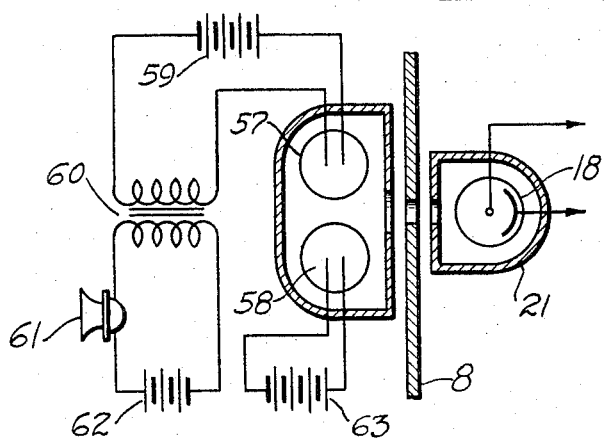
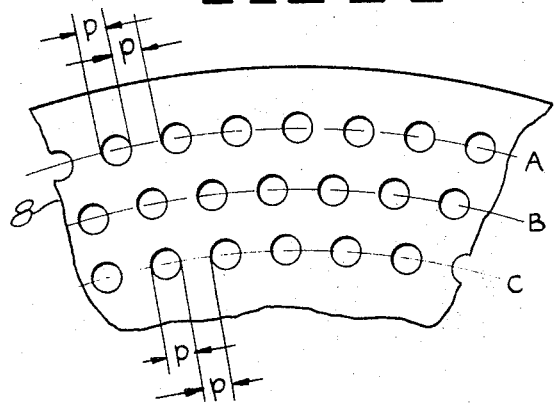
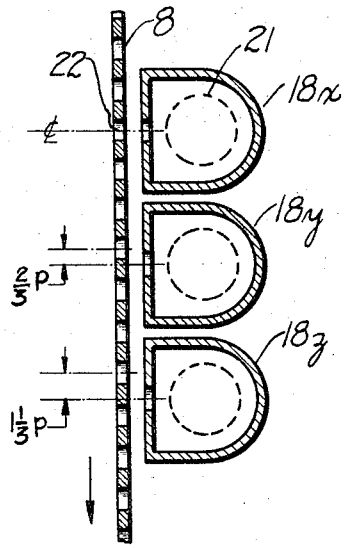
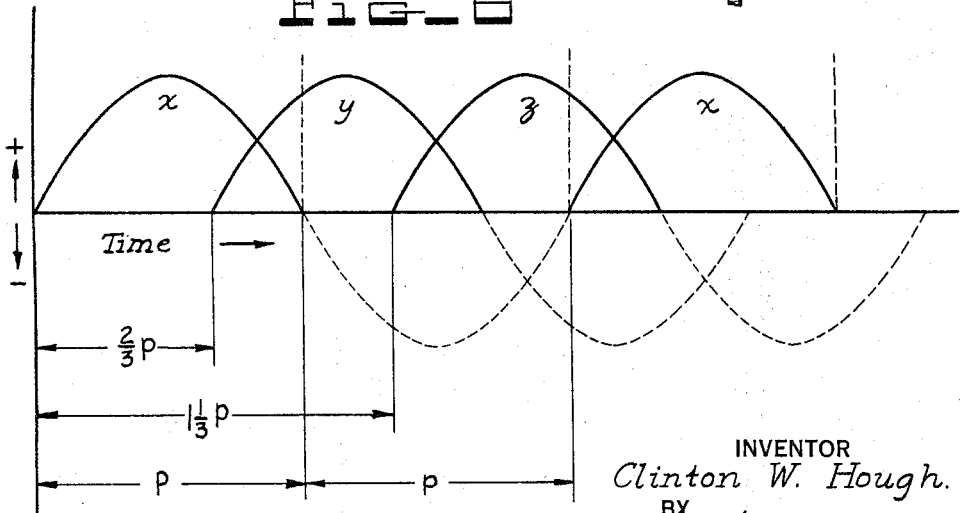

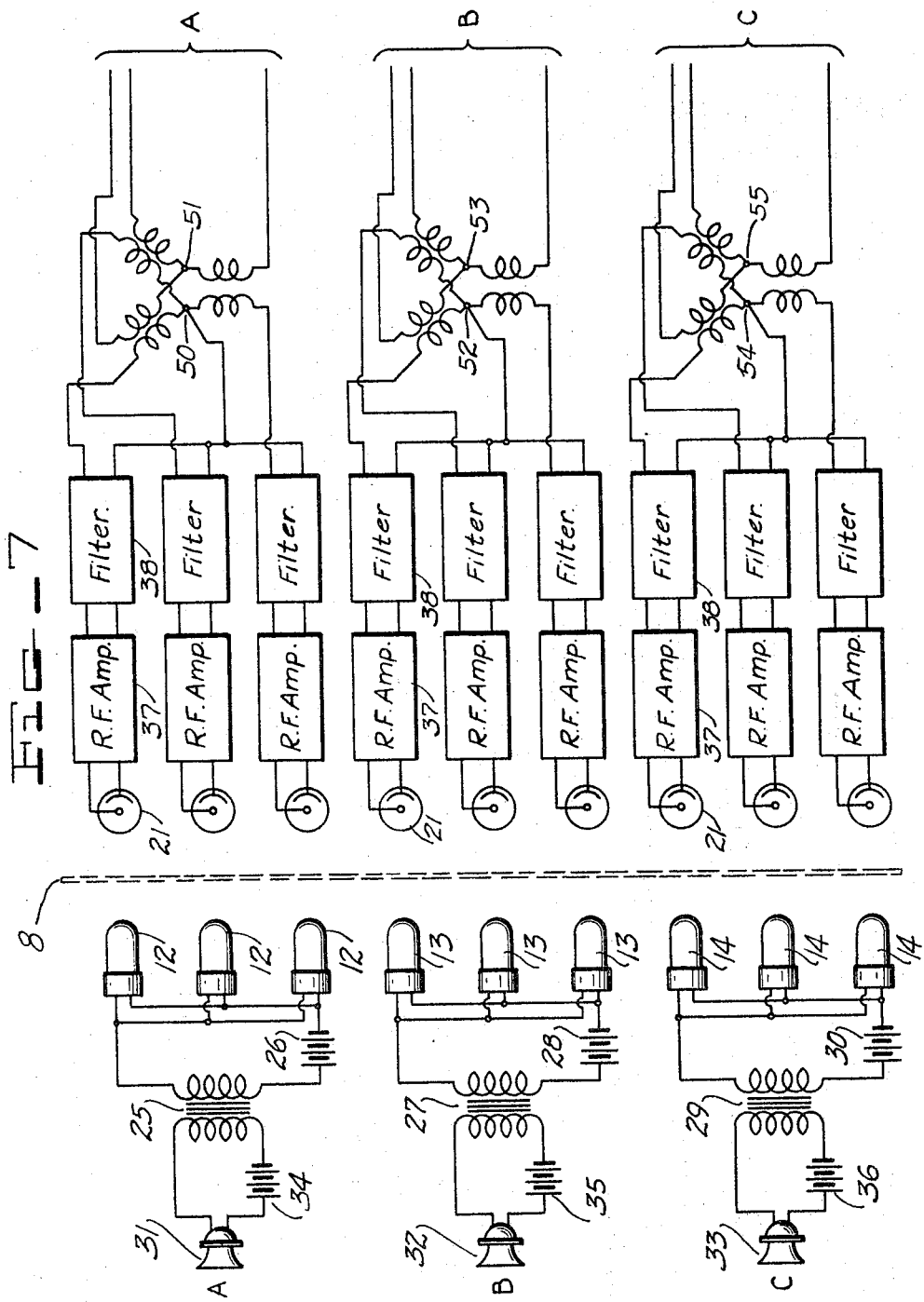

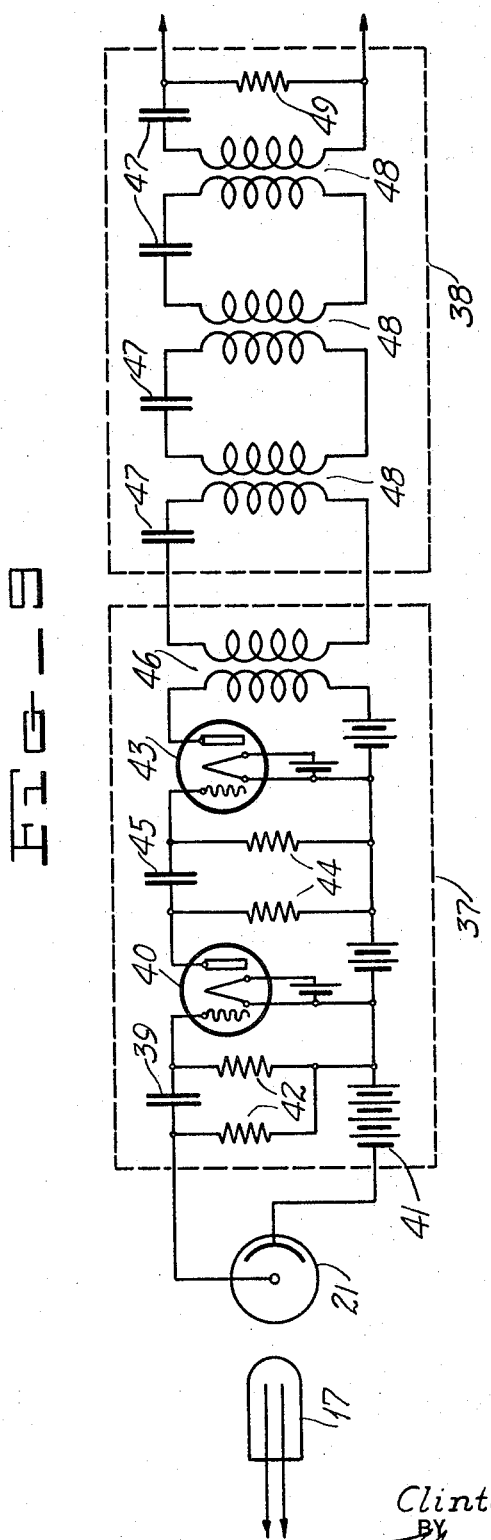

Patented Nov. 1, 1932

1,886,188

UNITED STATES PATENT OFFICE

CLINTON W. HOUGH, OF NEW YORK, N. Y., ASSIGNOR TO WIRED RADIO, INC., OF NEW YORK, N. Y., A CORPORATION OF DELAWARE

HIGH FREQUENCY GENERATOR AND MODULATOR

Application filed July 22, 1930. Serial No. 469,725.

My invention relates to systems for producing modulated high frequency alternating currents.

One of the objects of my invention consists in providing a polyphase multi-frequency alternating current generator and modulator.

Another object consists in providing a system adapted to produce modulated high frequency alternating currents and in which modulation occurs before oscillation generation.

Another object consists in producing a polyphase multi-frequency generator in which frequency and phase can be conveniently altered by mechanical means.

I accomplish the above desirable objects in a novel high frequency generator and modulator in which a source of light rays and a plurality of photosensitive cells are respectively disposed on opposite sides of a rotating perforated disk.

In the drawings accompanying and forming a part of the specification and in which like reference numerals designate corresponding parts throughout:

Fig. 1 is a front elevation of one embodiment of the high frequency generator and modulator of my invention.

Fig. 2 is a side elevation of the embodiment of Fig. 1.

Fig. 3 is a fragmentary sectional view of the relative arrangement of a photoelectric cell and lamp used in my system.

Fig. 4 is a diagrammatic representation of an alternative modulation system.

Fig. 5 is a schematic sectional view of the arrangement of an interruption disc with reference to a group of photoelectric cells employed in my high frequency generator and modulator.

Fig. 6 is a graphical representation of a polyphase current of a single frequency.

Fig. 7 is a diagrammatic representation of the electrical organization of my invention.

Fig. 8 is a fragmentary view of the interruption disk shown in Fig. 1.

Fig. 9 is a diagrammatic representation of a typical circuit employed in the organization of Fig. 7.

My invention contemplates varying the intensities of a plurality of light beams in accordance with modulating currents and interrupting these light beams at super-audible frequencies by a common mechanical means in a manner adapted to produce multi-frequency polyphase modulated alternating currents.

Referring to the drawings in detail, and particularly to Fig. 1, a mounting ring 1 is securely positioned upon a bracket 2 which is in turn secured to a base 3.

Referring to Fig. 2, an annular slot 4 is provided in the mounting ring 1. Another mounting ring 5, similar in construction to, and co-extensive with, the mounting ring 1, and having an annular slot 6, is positioned on the bracket 7 which is secured to the base 3, as shown. An opaque disk 8 is interposed between the mounting rings 1 and 5 and is secured to the armature shaft 9 of the motor 10. The motor 10 is secured to standards 11 which are mounted on the base 3.

A plurality of lamp housings 12, 13, and 14 are positioned in groups, as shown, about the mounting ring 1. Referring to Fig. 3, it will be seen that the lamp housing 12 is secured to the ring 1 by means of a hollow stud 15 which extends through the annular slot 4 and is secured by a nut 16. It will be obvious that by such an arrangement the lamp housings can be adjusted for any angular position around the ring 1. A neon glow lamp 17 is mounted within each of the lamp housings and serves as a light source. Connection wires can be extended through the hollow stud 15. For simplicity of description the lamp housing together with the neon lamp therein will be referred to as a light source.

As indicated in Fig. 2, a photoelectric cell housing 18 is positioned approximately opposite the lamp housing 12. Referring to Fig. 3, the photoelectric cell housing 18 is secured to the mounting ring 5 by means of a hollow stud 19 extending through the slot 6 and secured by a nut 20. A photoelectric cell 21 is positioned within the housing 18 so that the sensitized cathode is directed towards the corresponding lamp housing. It will be noted that apertures are provided in both the lamp housing and the photoelectric cell housing so that light will be directed from the glow lamp contained within the lamp housing to the sensitized cathode of the photoelectric cell.

Fig. 3 is illustrative of the structural arrangement of each lamp housing and the corresponding photoelectric cell housing used in my system. As before pointed out, there are a plurality of light sources disposed at different angular positions about the ring 1 on one side of the opaque disk 8 and that there are a corresponding number of photosensitive devices similarly positioned about the ring 5 on the other side of the disk 8 and in position approximately opposite the respective light sources.

The disk 8 is provided with several annular series of apertures. One series of apertures is provided for each group of lamp housings. That is, the series of apertures 22 is provided for the group of lamp housings 12; the series of apertures 23 is provided for the housings 13; while the series of apertures 24 is provided for the housings 14. The lamp housings 12 are arranged so that they will direct light only through the apertures 22, the lamp housings 13 will direct light only through the apertures 23, while the lamp housings 14 will direct light only through the apertures 24. In the present embodiment of my invention, each annular series of apertures comprises a different number of apertures corresponding to different super-audible frequencies.

Referring to Fig. 8, it will be seen that the diameter "$p$" of each aperture, regardless of its size, is equal to the arcuate distance between each aperture. In other words, the apertures are so arranged that when the disk 8 is rotated, at a constant speed, past a lamp housing, there will be alternate dark and light intervals of equal duration.

In Fig. 7 the neon lamps in the housings 12 are connected in parallel to the secondary of a transformer 25 and battery 26. The lamps in the housings 13 are similarly connected to transformer 27 and battery 28, while the lamps in housings 14 are connected to transformer 29 and battery 30. The primaries of the transformers 25, 27, and 29 are connected in series with microphones 31, 32, 33, and batteries 34, 35, and 36 respectively. Such an arrangement provides means to vary the illumination intensity of the respective groups of light sources in accordance with modulating currents under control of acoustic vibrations at audible frequencies incident upon the diaphragms of the respective microphones 31, 32, and 33.

The photoelectric cells 18 under control of each of the light sources are individually connected to separate radio frequency amplifiers 37 and filter systems 38 as shown.

The group of light sources 12 which in Fig. 1 are associated with the annular series of apertures 22, comprises one frequency channel which will be designated as channel "A". The light sources 13 which are associated with the annular series of apertures 23 comprise another frequency channel "B", while the group of light sources 14 associated with the annular series of apertures 24 comprise another frequency channel "C". Since each of the light sources in any of the groups A, B, or C engages with the same series of apertures as any other light source of the same group, it is evident that the frequency which is determined by the number of apertures in that particular series is common to that group. The filter systems 38 associated in any particular group are of the band pass type, and will limit the frequency output of that group to the frequency developed by the annular series of apertures associated therewith when the disk 8 is rotated at a predetermined speed. This filter system attenuates harmonics as well as all other frequencies other than the one desired.

The radio frequency amplifiers 37 and filter systems 38 shown in Fig. 7 can be of any conventional type suitable for the purpose indicated and which are well known in the art. A typical example of a type of amplifier and filter which I have found, in experiments, to be satisfactory, is illustrated in Fig. 9. The anode of the photoelectric cell 21 is connected to a capacitance 39 and thence to the grid of a thermionic tube 40, while the cathode of the photoelectric cell 21 is connected through battery 41 to the filament of the tube 40. Resistances 42 are provided across the grid to filament of the tube 40 as shown. The tube 40 is connected to another thermionic tube 43 by a resistance-capacitance 44—45, while the output of the tube 43 is connected to the battery of the radio frequency transformer 46. Such an organization comprises a photoelectric cell amplifier which is commonly used and well known in the art.

The output of the transformer 46 is connected in series with one of four inductively coupled circuits comprising the capacitances 47 and the inductances 48. A terminating impedance 49 of proper value is connected across the last coupled circuit. These four circuits comprise a three-mesh band pass filter of conventional type well known in the art.

It is to be understood that the circuit of Fig. 9 is shown merely to illustrate a type of amplifier and filter system which can be successfully employed as a part of my high frequency generator and modulator. However, the exact arrangement of these circuits is immaterial and does not constitute a part of my invention.

The outputs of the filters 38 associated in group "A", in Fig. 7, converge as shown in a Y-connection 50 which forms the primary of a three-phase radio frequency transformer. The secondary Y-connection 51 forms a common output for frequency channel "A". The outputs of the filter systems 38 associated in channel B converge in a Y-connection 52 which forms the primary of another three-phase radio frequency transformer. The secondary Y-connection of this transformer forms the common output for frequency channel "B". The outputs of the filters 38 converge in a Y-connection 54 which forms the primary of still another three-phase radio frequency transformer. The secondary Y-connection 55 of this transformer forms the common output for frequency channel "C".

Fig. 5 schematically represents the relation of one group of photoelectric cell housings to the disk 8. The housings here shown constitute a group associated with one frequency channel, such as channel "A", "B", or "C". These photoelectric cell housings $18x, 18y$, and $18z$ are disposed opposite the disk 8 in a manner adapted to produce phase displacement in the common output circuit of the photoelectric cells 21 contained within each housing. This is accomplished by disposing the photoelectric cell housings with relation to the series of apertures in the disk 8 in a manner such that the apertures in housing $18x$ will be in full engagement with one of the apertures 22 in the disk 8, while the aperture in the photoelectric cell housing $18y$ will be displaced from full engagement with one of the apertures in the disk 8 by an arcuate distance equal to $$\frac{2}{3}p$$

where $p$ equals the diameter of any one of the apertures 22. As before pointed out, the diameter $p$ of each aperture is exactly equal to the space between each aperture (see Fig. 8). The aperture in the housing $18z$ will be displaced from the next successive hole, in the direction of rotation indicated by the arrow, by $$1\frac{1}{3}p.$$

Each aperture can be shaped so as to admit light to a photoelectric cell, in traversing the aperture in a corresponding photoelectric cell housing, in a manner adapted to produce a positive current impulse of sinusoidal form in the circuit under control of the photoelectric cell.

Fig. 4 represents an alternative method of modulation which differs from that shown in Fig. 7 in that a source of biasing illumination is provided in addition to the modulated light source. In this arrangement, two neon lamps 57 and 58 are positioned within an elongated lamp housing 56. The neon lamp 57 is connected in series with battery 59 in the secondary of a transformer 60, the primary of which is in turn connected to a microphone 61 and battery 62. The neon lamp 58 is connected to battery 63. In this arrangement, the neon lamp 58 is maintained at a steady illumination intensity, while the intensity of illumination of the lamp 57 is varied in accordance with the modulating currents under control of the microphone 61. The photoelectric cell 18 is therefore under control of the additive intensities of the two lamps 57 and 58, the intensity of the lamp 58 serving to bias the operation of the photoelectric cell 18. Such an arrangement for modulation may be very desirable for some purposes, especially when it is desired to modulate on a higher part of the characteristic curve of the photoelectric cell.

The operation of my high frequency generator and modulator will be apparent from the following:

To produce a plurality of modulated high frequency polyphase currents each of which has definite phase relationship, the microphones 31, 32 and 33 constitute current controlling means for varying the intensities of illumination of the groups of light sources 12, 13 and 14. Each of these groups (see Fig. 7) corresponds to one frequency to be produced, while each light source in each group corresponds to one phase of that particular frequency. It is evident from the arrangement of Fig. 7 that all of the phases of a particular frequency will be equally modulated by the microphone peculiar to that frequency group.

The light from each group of light sources is interrupted at super-audible frequencies by the disk 8, which is made to revolve at high speed by the motor 10. The light which falls upon the photoelectric cells is then the equivalent of a modulated high frequency current.

The exact procedure for producing polyphase current in one frequency channel will now be considered. It will be assumed that the photoelectric cell housings $18x$, $18y$, and $18z$ shown in Fig. 5 are the photosensitive means under control of the light source 12 in frequency channel "A". As before stated, these photoelectric cell housings have a definite relationship to the apertures in the disk 8. When the aperture 22 passes completely across the aperture in the photoelectric cell housing $18x$, there will be a positive sinusoidal current impulse set up in the photoelectric cell 21 associated therewith, the impulse being represented by the full line curve $x$ in Fig. 6. As the disk 8 is further revolved, current impulses will be produced by the photoelectric cells in housing $18y$ and $18z$, the impulses being represented by the full line curves $y$ and $z$, respectively. These positive current impulses will have the time relationship depicted in Fig. 6. The positive current impulses, or positive half-cycles produced by each photoelectric cell will be amplified in a respective radio frequency amplifier 37, one of which is shown in detail in Fig. 9.

Referring to Fig. 9, the positive impulse will be amplified through the thermionic tubes 40 and 43 and a counter E. M. F. will be induced in the secondary of the transformer 46 thereby producing an alternating current in the output of the filter systems 38. The negative half-cycles are indicated by dotted line curves in Fig. 6. It will be noted that the distance, in time, between each positive half-cycle denoted by $p$ is equal to the duration of each positive half-cycle. The output from each of the three filters are combined in the three-phase Y-connection transformer 50—51 to produce a common three-phase output current of one frequency. Such a procedure is true for each frequency channel.

It is of course to be understood that the lamp housings and photoelectric cell housings in my high frequency modulator can be adjusted with reference to the interrupting disk so as to produce any kind of phase relation. It will also be understood that various numbers of light sources and photosensitive means can be employed to produce any number of phases and any number of different frequencies. The arrangement of the holes in the disk can also be varied as described.

The present three-phase, three-frequency, high frequency generator and modulator, which comprises one embodiment of my invention, is particularly adapted for certain types of work, such as wired radio broadcasting where it is desirable to produce three different modulated high frequency channels, each of which is three-phase.

Although I have shown a preferred embodiment of my generator and modulator, I am aware that many modifications and changes will readily occur to those skilled in the art but which will not depart from the intended scope of my invention. I do not therefore desire to limit myself to the foregoing, except insofar as may be pointed out in the appended claims.

What I claim as new and original and desire to secure by Letters Patent of the United States is:

1. A high frequency generator and modulator comprising, a source of irradiations, means adapted to vary the intensity of said irradiations at audible frequencies, a plurality of photosensitive cells under control of said irradiations, an output circuit for each of said photosensitive cells, a source of current for each of said output circuits, said output circuits being electrically connected in definite groups; and mechanical means adapted to periodically intercept said irradiations to produce a definite super-audible frequency current in each of said groups of output circuits, the photosensitive cells connected to the circuits forming any one of said groups being relatively positioned with respect to said mechanical means in a manner adapted to produce phase displacement of the currents in said group.

2. A high frequency generator and modulator comprising, a plurality of current controlling devices, a source of light rays under control of each of said current controlling devices, a group of photosensitive cells under control of each of said sources of light rays, means common to all of said groups of photosensitive cells and adapted to successively expose each photosensitive cell in any one of said groups to said light rays in definite phase relationship, but exposing each of said groups of cells at definite super-audible frequencies.

3. A high frequency generator and modulator comprising, a plurality of current controlling devices, a source of light rays under control of each of said current controlling devices, a group of photosensitive cells under control of each of said sources of light rays, an output circuit for each of said photosensitive cells, a source of current for each of said output circuits, said output circuits for each of said groups of photosensitive cells being electrically interconnected; a screen common to all of said photosensitive cells and adapted to intermittently expose each of said groups of cells to said light rays at definite frequencies, each photosensitive cell in any one of said groups of cells being displaced from each other cell in said group with reference to said screen in a manner adapted to produce phase displacement in the frequency of the currents common to said group of cells.

4. A high frequency generator and modulator comprising, in combination, a source of audible frequency currents, a source of irradiations under control of said audible frequency currents, a plurality of photosensitive cells under control of said irradiations, an output circuit for each of said photosensitive cells, a source of current for each of said photosensitive cells, means adapted to interrupt said irradiations to produce a modulated current of definite frequency in each of said output circuits, and electrical means interconnecting said output circuits in a manner adapted to produce polyphase output current.

5. A high frequency generator and modulator comprising, a source of irradiations, a plurality of photoelectric cells, a rotatable screen interposed between said source of irradiations and said photoelectric cells, said screen having apertures adapted to periodically expose said photoelectric cells to the influence of said irradiations; an output circuit for each of said photoelectric cells, a source of current for each of said output circuits, and means adapted to rotate said screen to produce a plurality of discrete polyphase currents of super-audible frequencies in said output circuits.

6. A high frequency generator and modulator comprising, an opaque disk having a multiplicity of transparent apertures, a source of light rays positioned on one side of said disk, means adapted to control the intensity of said light rays, a plurality of photoelectric cells positioned on the other side of said disk, an output circuit for each of said photoelectric cells, a source of current for each of said output circuits, means adapted to rotate said disk to produce currents of super-audible frequencies in said output circuits, said photoelectric cells being positioned in groups with reference to said disk in a manner adapted to produce currents of different frequencies in each of said groups and phase displacement between the current of each photoelectric cell in any one group; and a common output circuit connecting all of said output circuits having the same frequencies but different phase relationships.

7. A high frequency generator and modulator comprising, a source of irradiations, means adapted to vary the intensity of said irradiations, a plurality of groups of photoelectric cells under control of said irradiations, and a disk having a plurality of concentric annular series of apertures, each of said series of apertures being proximate to one of said groups of photoelectric cells, and all of the photoelectric cells in any one of said groups being displaced from each other with reference to instantaneous proximity with any one of the apertures of the series of apertures peculiar to said group.

CLINTON W. HOUGH.